(12) United States Patent
Nagashima

(10) Patent No.: US 6,847,709 B2
(45) Date of Patent: Jan. 25, 2005

(54) PRIVATE BRANCH EXCHANGE APPARATUS AND ACCOUNTING PROCESS METHOD

(75) Inventor: Hiroaki Nagashima, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 281 days.

(21) Appl. No.: 09/994,835

(22) Filed: Nov. 28, 2001

(65) Prior Publication Data

US 2002/0064262 A1 May 30, 2002

(30) Foreign Application Priority Data

Nov. 29, 2000 (JP) ....................... 2000-363417

(51) Int. Cl.$^7$ ............................................. H04M 15/00
(52) U.S. Cl. .............................. 379/121.01; 379/114.01; 379/128
(58) Field of Search ....................... 379/121.01, 214.01, 379/114.09, 114.01, 128, 111, 114.03, 117, 124, 137

(56) References Cited

U.S. PATENT DOCUMENTS

| | | | | |
|---|---|---|---|---|
| 4,072,827 A | * | 2/1978 | Oman ........................ | 379/122 |
| 5,343,517 A | * | 8/1994 | Bogart et al. ............... | 379/219 |
| 5,528,621 A | * | 6/1996 | Heiman et al. ............. | 375/133 |
| 5,661,782 A | * | 8/1997 | Bartholomew et al. .. | 379/88.18 |

FOREIGN PATENT DOCUMENTS

| JP | 62-12262 | 1/1987 |
|---|---|---|
| JP | 4-014946 | 1/1992 |

OTHER PUBLICATIONS

Tominaga Yoshinobu et al; "Call Charging System", Patent Abstracts of Japan of JP 57072463 A, May 6, 1982.

Sakagami Koichi; "Electronic Exchange With Call Time Measuring Instrument", Patent Abstracts of Japan of JP 62012262 A, Jan. 21, 1987.

\* cited by examiner

*Primary Examiner*—Curtis Kuntz
*Assistant Examiner*—Barry W Taylor
(74) *Attorney, Agent, or Firm*—Finnegan, Henderson, Farabow, Garrett & Dunner, L.L.P.

(57) ABSTRACT

Each time the time in a timer is re-set, a control section overwrites a difference integration value corresponding to the amount of the change from a reference value "0" in an registration memory of a memory section. When a call is sent from an extension to an outside line, the control section first reads out the difference integration value from the registration memory and stores on a management table the read-out difference integration value and call beginning time information in association with the call-sending extension. If the call between the extension and the outside line is finished, the control section calculates a call charge associated with the call-sending extension, on the basis of call end time information, the difference integration value stored in the registration memory, and the call beginning time information and difference integration value associated with the call-sending extension, which are registered on the management table.

6 Claims, 3 Drawing Sheets

| CALL NO. | CALL BEGINNING TIME | INTEGRATION DATA AT CALL BEGINNING TIME | OTHER DATA |
|---|---|---|---|
| A | tSA | tDA | |
| B | tSB | tDB | |
| C | tSC | tDC | |
| D | tSD | tDD | |

PRIVATE BRANCH EXCHANGE APPARATUS AND ACCOUNTING PROCESS METHOD

CROSS REFERENCE TO RELATED APPLICATIONS

This application is based upon and claims the benefit of priority from the prior Japanese Patent Application No. 2000-363417, filed Nov. 29, 2000, the entire contents of which are incorporated herein by reference.

BACKGROUND OF THE INVENTION

1. Field of the Invention

The present invention relates generally to a private branch exchange apparatus and accounting process method used in an office, a business branch, etc., and more particular to a private branch exchange wherein an accounting process is executed on a calling-side extension when a call is made from an extension to an outside line.

2. Description of the Related Art

In general, a currently used private branch exchange apparatus has various service functions. One of the service functions is an accounting process function. The accounting process function has a memory table and timer, The memory table is registered identification number information indicative of communication service providers, and information indicative of call charges associated with the identification number information. When a call is sent from an extension to an outside line, an accounting process function executes accounting process on the basis of the registered content of the memory table and a difference between a call beginning time and a call end time measured by the timer.

In this type of private branch exchange apparatus, the timer needs to be re-set for various reasons. As a result, an accounting calculation result relating to a call made during the time in which the timer is re-set may differ from an accounting calculation result relating to the actual call time. In order to solve this problem, there is a method wherein when the time of the timer has been changed, call beginning times of all existing calls, which are managed by the private branch exchange apparatus, are rewritten in a batch.

In this method, however, a CPU executes a process relating to calls, a batch-rewrite process for call beginning times and an accounting calculation process for call-sending extensions. Thus, the processing load of the CPU increases, and a predetermined time is needed for the batch-rewrite of call beginning times due to the change of time. When the rewriting work is performed at the time of the end of calls, a serious problem arises with the execution of the accounting calculation process.

BRIEF SUMMARY OF THE INVENTION

The object of the present invention is to provide a private branch exchange apparatus and accounting process method capable of executing, even when a re-setting of time has occurred during a call, an accounting process on a call-sending extension without influence of the re-setting of time.

The present invention may provide a private branch exchange apparatus having a timer, being capable of connecting a plurality of extensions to extension terminals, and being capable of connecting at least one outside line, the private branch exchange apparatus calculating a call charge on the basis of start time information and end time information measured by the timer in association with a call-sending extension, the apparatus comprising: detection means for detecting a re-setting of time in the timer, generating a detection signal; first storing means for storing a difference integration value corresponding to an amount of change from a reference value in response to the detection signal; second storing means for storing information necessary for the accounting calculation process for each extension; and control means for making the second storing means store, the start time information supplied from the timer and the difference integration value supplied from the first storing means, in the second storing means in association with the call-sending extension, and making the accounting calculation process associated with the call-sending extension execute in response to the end time information supplied from the timer, on the basis of the end time information, the difference integration value supplied from the first storing means, and the start time information and differential integration value supplied from the second storing means.

DETAILED DESCRIPTION OF THE INVENTION

An embodiment of the present invention will now be described in detail with reference to the accompanying drawings.

Figure 1:
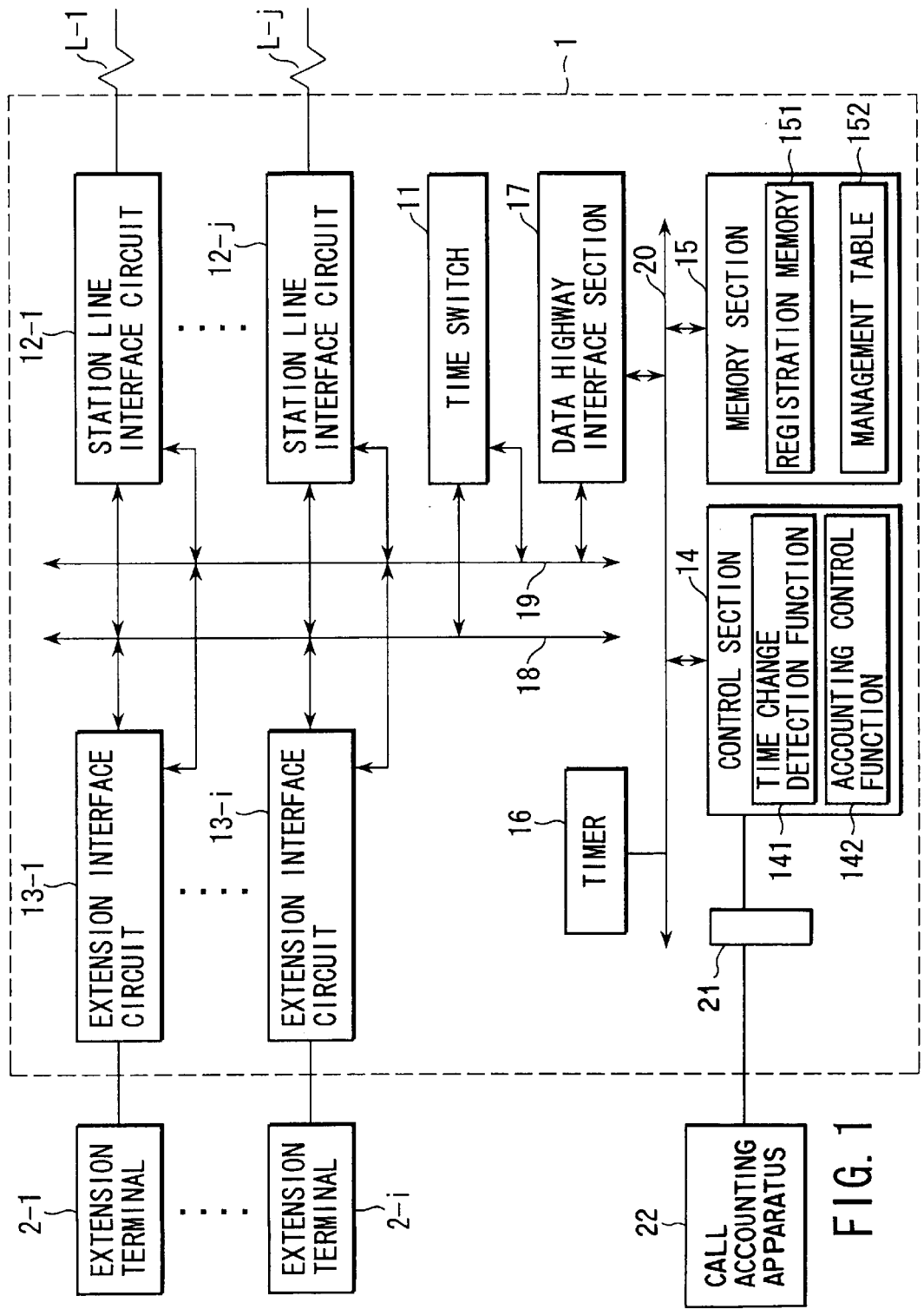
FIG. 1 is a block diagram schematically showing an embodiment of a private branch exchange system using a private branch exchange apparatus of the present invention.

FIG. 1 schematically shows the structure of a private branch exchanged (PBX) system according to an embodiment of the invention.

The PBX system, as shown in FIG. 1, is constructed such that a plurality of extension terminals 2 (2-1 to 2-$i$) (maximum number=i) are connected, as desired, to a private branch exchange (PBX) apparatus 1.

The PBX apparatus 1 comprises a time switch 11, a plurality of (i.e. a j-number of) station line interface circuits 12 (12-1 to 12-$j$), a plurality of (i.e. an i-number of) extension interface circuits 13 (13-1 to 13-$i$), a control section 14, a memory section 15, a timer 16, and a data highway interface section 17. The time switch 11, station line interface circuits 12 and extension interface circuits 13 are interconnected via a PCM highway 18.

The time switch 11, station line interface circuits 12, extension interface circuits 13 and data highway interface section 17 are interconnected via a data highway 19. The control section 14, memory section 15, timer 16 and data highway interface section 17 are interconnected via a CPU bus 20.

The time switch 11 switches time slots on the PCM highway 18 under control of the control section 14, thus switching and connecting the station line interface circuits 12 and extension interface circuits 13 in a desired fashion.

Station lines L (L-1 to L-$j$) such as public lines or dedicated lines are connected to the station line interface circuits 12 on an as-needed basis. The station line interface circuit 12 performs station line interface operations associated with the connected station line L. The station line interface operations include conversion from a voice signal (analog), which is delivered via the station line L, to a PCM signal; conversion from a PCM signal, which is delivered via the time switch 11, to a voice signal (analog); monitoring of the station lines L; and transmission of various signals to a network connected via the station lines L. The station line interface circuit 12 executes transmission/reception of various control information relating to the station line interface operations with the control section 14 via the data highway 19, data highway interface section 17 and CPU bus 20.

The extension terminals 2 are connected to the extension interface circuits 13 on an as-needed basis. The extension interface circuit 13 performs extension interface operations relating to the connected extension terminal 2. The extension interface operations include extraction of a PCM signal, which is output from the extension terminal 2, from the PCM highway 18; monitoring of the extension terminal 2; and transmission of various signals to the extension terminal 2. The extension interface circuit 13 executes transmission/reception of various control information relating to the extension interface operations with the control section 14 via the data highway 19, data highway interface section 17 and CPU bus 20.

The control section 14 executes processes based on operation programs stored in the memory section 15 and thus generally controls the time switch 11, station line interface circuits 12 and extension interface circuits 13. Thereby, the operations of the PBX apparatus 1 are realized.

The memory section 15 stores operation programs for the control section 14 and other various data for permanent use.

The timer 16 measures the present time.

The data highway interface section 17 executes data transmission/reception between the data highway 19 and CPU bus 20.

The control section 14 according to this embodiment is provided with a time change detection function 141 and an accounting control function 142. In addition, the memory section 15 is provided with an integration value registration memory 151 (hereinafter referred to as "registration memory 151") and a call-associated information management table 152 (hereinafter "management table 152").

The time change detection function 141 detects change of time in the timer 16 and, each time the change is detected, overwrites a difference integration value corresponding to the amount of change from a reference value "0" in the registration memory 151 of memory section 15.

For example, when a call is sent from the extension terminal 2-1 to the station line L-1, the accounting control function 142 associates information on time measured by the timer 16 at that time point and a difference integration value stored in the registration memory 151 with the call-sending extension terminal 2-1, and stores the associated data in the management table 152. When the call has ended, the accounting control function 142 executes a control relating to an accounting calculation process for the call-sending extension terminal 2-1 on the basis of time information measured by the timer 16 at this time point, the difference integration value stored in the registration memory 151, and the call time information and difference integration value stored in the management table 152.

Figures 2, 4:
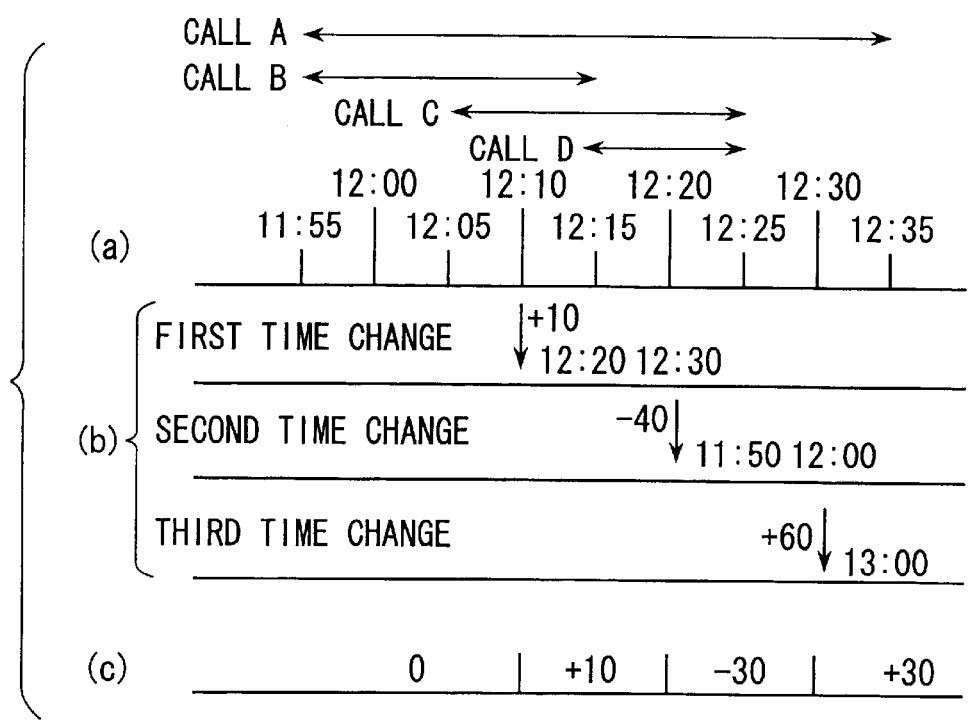
FIG. 2 shows a structure of a call-associated information management table shown in FIG. 1.
FIG. 4 is a view for explaining a method of calculating an individual call time by means of the control section shown in FIG. 1.

The management table 152, as shown in FIG. 2, stores a call beginning time and integration data at the call beginning time in association with a call number assigned to the extension terminal 2.

The control section 14 is connected to a call accounting apparatus 22 via a interface 21. The call accounting apparatus 22 selectively executes a control relating to an accounting calculation process for the call-sending extension terminal 2-1 on the basis of the call time information and difference integration value stored in the management table 152 in response to a preset command data supplied from an exterior. For example, the interface 21 is used RS232C.

The operation of the system with the above-described structure will now be described.

For example, when a call has been sent from the extension terminal 2-1, the control section 14 recognizes which extension phone number, i.e. call number, is associated with the call. Then, when a special number for connection to the station line L-1, for instance, has been dialed from the call-sending extension, the control section 14 registers the recognized call number in a call number column of the management table 152. If called party on the station line L-1 side has answered, the control section 14 registers the time of the timer 16 in a call beginning time column of the management table 152 in association with the call-sending extension.

If either called party or the call-sending extension terminal 2-1 is set in the on-hook state and the line is disconnected, the control section 14 executes the accounting calculation process for calculating the call charge for the extension terminal 2-1, on the basis of the call end time and the call beginning time registered on the management table 152.

However, if the time measured in the timer 16 is changed during a call, an accounting calculation result for the call, may differ from an accounting calculation result on the actual call time, during which the change of time has taken place. To solve this problem, the control section 14 has to add the amount of change in time to all call beginning times registered on the management table 152. This increases the processing load on the control section 14. Under the circumstances, in the present embodiment, the registration memory 151 is prepared to register a difference integration value due to the change in time, and the management table 152 is additionally provided with a column for registering integration data at the call beginning time.

Figure 3:
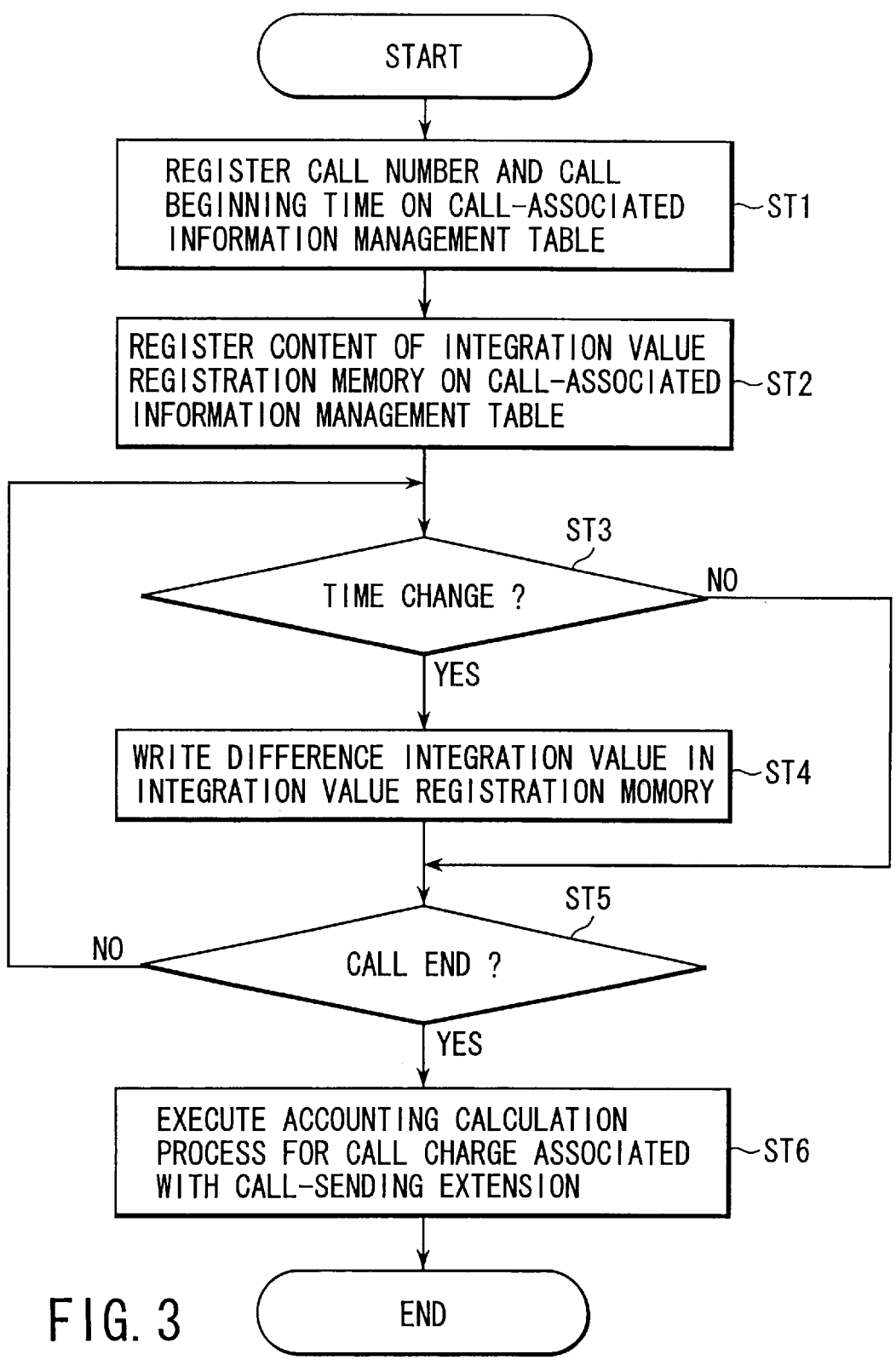
FIG. 3 is a flow chart illustrating control procedures and control contents of an accounting calculation process executed by a control section shown in FIG. 1.

FIG. 3 is a flow chart illustrating control procedures and control contents of the accounting calculation process executed by the control section 14 when the change in time has taken place.

For example, if a call is sent from the extension terminal 2-1 to the station line L-1, the control section 14 starts a control process, as illustrated in FIG. 3.

If the control process is started, the control section 14 registers on the management table 152 a call number of the call-sending extension terminal 2-1 and a call beginning time measured by the timer 16 (step ST1).

The control section 14 registers on the management table 152 a difference integration value, which is stored in the registration memory 151, in association with the call-sending terminal (step ST2). Alternatively, the system may have only one registration memory 151.

The control section 14 determines whether the time in the timer 16 has been changed (step ST3). If the time has been changed (YES), the control section 14 overwrites the difference integration value in the registration memory 151 (step ST4).

The control section 14 determines whether the other-side party or the call-sending extension terminal 2-1 is set in the on-hook state (step ST5). The process of steps ST3 to ST5 is repeated until the other-side party or the call-sending extension terminal 2-1 is set in the on-hook state.

If the on-hook state is detected (YES), the control section 14 reads out of the management table 152 the call beginning time information and difference integration value associated with the extension terminal 2-1. In addition, the control section 14 reads out the difference integration value at the time of the end of the call from the registration memory 151. The control section 14 executes the accounting calculation process for the call charge associated with the call-sending extension terminal 2-1 on the basis of the read-out information (step ST6).

Referring to FIG. 4, the accounting calculation process will now be described in greater detail. In FIG. 4, a portion (a) indicates time information measured by the timer 16, a portion (b) the amount of change in time in the timer 16, and a portion (c) the difference integration value.

Assume that the extension terminal 2-1 is associated with call A. A call beginning time measured by the timer 16 is "11:55", a call end time measured by the timer 16 is "13:00", the difference integration value stored in the registration memory 151 at the time of beginning of the call is "0", and the difference integration value stored in the registration memory 151 at the time of end of the call is "+30". In this case, the actual call time relating to call A, which is calculated by the control section 14, is given by 13:00−11:55−(+30−0)=40 (min.)

Assume that the extension terminal 2-2 is associated with call B. A call beginning time measured by the timer 16 is "11:55", a call end time measured by the timer 16 is "12:25", the difference integration value stored in the registration memory 151 at the time of beginning of the call is "0", and the difference integration value stored in the registration memory 151 at the time of end of the call is "+10". In this case, the actual call time relating to call B, which is calculated by the control section 14, is given by 12:25−11:55−(+10−0)=20 (min.)

Assume that the extension terminal 2-3 is associated with call C. A call beginning time measured by the timer 16 is "112:05", a call end time measured by the timer 16 is "11:55", the difference integration value stored in the registration memory 151 at the time of beginning of the call is "0", and the difference integration value stored in the registration memory 151 at the time of end of the call is "−30". In this case, the actual call time relating to call C, which is calculated by the control section 14, is given by 11:55−12:05−(−30−0)=20 (min.)

Assume that the extension terminal 2-4 is associated with call D. A call beginning time measured by the timer 16 is "12:25", a call end time measured by the timer 16 is "11:55", the difference integration value stored in the registration memory 151 at the time of beginning of the call is "+10", and the difference integration value stored in the registration memory 151 at the time of end of the call is "−30". In this case, the actual call time relating to call D, which is calculated by the control section 14, is given by 11:55−12:25−(−30−10)=10 (min.)

In general cases, the difference integration value is definite with a settable range. It should suffice if the difference integration value is set so that the difference between a maximum (future) value and a minimum (past) value in the PBX apparatus 1 can be managed. Therefore, no matter how the timer is re-set within this range, the difference integration value falls within the range.

As has been described above, according to the present embodiment, in the PBX 1, each time the time of the timer 16 has been re-set, the difference integration value corresponding to the amount of change in time from the reference value "0" is overwritten on the registration memory 151 of memory section 15. When a call is sent from an extension to an outside line, the control section 14 first reads out the difference integration value from the registration memory 151 and stores on the management table 152 the read-out difference integration value and call beginning time information in association with the call-sending extension. If the call between the extension and the outside line is finished, the control section 14 executes the accounting calculation process for the call charge associated with the call-sending extension, on the basis of the call end time information, the difference integration value stored in the registration memory 151 at this time, and the call beginning time information and difference integration value associated with the call-sending extension, which are registered on the management table 152.

Specifically, when a call is sent from the extension to the outside line, the control section 14 accesses the CPU bus 20 at only three occasions: 1) when the difference integration value at the time of beginning of the call is read out of the registration memory 151 and the read-out difference integration value and call beginning time information are stored on the management table 152 in association with the call-sending extension, 2) when the difference integration value due to the change in time is overwritten on the registration memory 151 at the time at which the time of the timer has been re-set during the call, and 3) when the difference integration value at the time the call between the extension and outside line is finished is read out of the registration memory 151, and the call beginning time information and the difference integration value at this time are read out of the management table 152. In the other time slots, the control section is enabled to execute the accounting calculation process for respective calls, the communication process with external devices, etc.

According to the present embodiment, unlike the prior art, there is no need to batch-rewrite call beginning times relating to all calls when the change in time has taken place. Thereby, the processing load on the control section 14 due to the re-set in time is reduced, and the reduction in processing load makes it possible to efficiently execute the accounting calculation process for the call charge associated with the call-sending extension. Accordingly, the accounting calculation process for the call charge associated with the call-sending extension, which accords with the actual call time, can be executed without influence due to the re-setting of time.

In the present embodiment, each time the time of the timer 16 has been changed, the difference integration value reflecting the re-setting of time is overwritten on the registration memory 151. The accounting calculation process for the call charge associated with the call-sending extension is executed by the control section 14, using the difference integration value registered on the management table 152 at the time of beginning of the call, and the difference integration value stored in the registration memory 151 at the time of end of the call. Therefore, there is no need to provide a timer dedicated for changing the time, and only the timer 16 may be used. The structure of the PBX apparatus 1 is not made complex in order to cope with the changing of time.

In the present embodiment, when a call begins, the call beginning time and the difference integration value at this time are registered on the management table 152 in association with the call-sending extension. When the call ends, the accounting calculation process for the call charge associated with the call-sending extension is executed simply by using the difference integration value stored in the registration memory 151 at the time of end of the call and the call beginning time and the difference integration value, which were previously registered on the management table 152. Thus, the time in the timer 16 can be changed any number of times.

The above embodiment is directed to the case where the control section 14 executes the accounting calculation process for the call charge associated with the call-sending extension. Alternatively, only the accounting calculation process associated with the call-sending extension may be executed by the call accounting apparatus 22 or the like. In this case, the control section 14 may perform only three processes: 1) a process of reading out the difference integration value at the time of beginning of the call from the registration memory 151, and registering this difference integration value and call beginning time information on the management table 152 in association with the call-sending extension, 2) a process of overwriting, when the time in the timer has been re-set during the call, the difference integration value at this time point on the registration memory 151, and 3) a process of reading out, when the call between the extension and outside line is finished, the difference integration value at this time point from the registration memory 151, and writing this difference integration value and call end time information on the management table 152 in association with the call-sending extension. Thereby, the accounting calculation process associated with the call-sending extension may be executed by the maintenance terminal on the basis of the content registered on the management table 152.

In the above embodiment, the control section 14 overwrites the difference integration value due to the re-setting of time in the timer 16 on the registration memory 151. Alternatively, this difference integration value may automatically overwritten on the registration memory 151 in accordance with the re-setting of time in the timer 16. Thereby, the processing load on the control section 14 is further reduced, and the real-time performance of the accounting calculation process can be enhanced.

The structure of the PBX apparatus, the kind of extension terminals, the functions of the control section, the structure of the memory section, the kind of timer, the control procedures of the accounting calculation process, etc. may be variously modified without departing from the spirit of the invention.

As has been described above, the present invention may provide a private branch exchange apparatus and accounting process method capable of executing, even when a re-setting of time has occurred during a call, an accounting process on a call-sending extension without influence of the re-setting of time.

What is claimed is:

1. A private branch exchange apparatus, capable of connecting a plurality of extensions to extension terminals and connecting at least one outside line, comprising:
  a timer which measures a present time;
  detecting means for detecting a re-setting of time in the timer and generating a detection signal;
  first storing means for storing a difference integration value corresponding to an amount of change from a reference value in response to the detection signal;
  second storing means for storing information necessary for an accounting calculation process for a call charge based on time information measured by the timer in association with a call-sending extension for each extension; and
  controlling means for making the second storing means store start time information supplied from the timer and the difference integration value supplied from the first storing means, in the second storing means in association with the call-sending extension, when the call has started, and making the second storing means store end time information supplied from the timer and the difference integration value, in the second storing means in association with the extension, when the call has ended.

2. A private branch exchange apparatus capable of connecting a plurality of extensions to extension terminals, and capable of connecting at least one outside line, the apparatus comprising:
  a timer which measures a present time;
  detection means for detecting a re-setting of time in the timer and generating a detection signal;
  first storing means for storing a difference integration value corresponding to an amount of change from a reference value in response to the detection signal;
  second storing means for storing information necessary for an accounting calculation process for a call charge based on time information measured by the timer in association with a call-sending extension for each extension; and
  controlling means for making the second storing means store start time information supplied from the timer and the difference integration value supplied from the first storing means, in the second storing means in association with the call-sending extension, when the call has started, and making the accounting calculation process associated with the call-sending extension execute in response to end time information supplied from the timer, based on the end time information, the difference integration value supplied from the first storing means, and the start time information and difference integration value supplied from the second storing means, when the call has ended.

3. A private branch exchange apparatus capable of connecting a plurality of extensions to extension terminals, and capable of connecting at least one outside line, the apparatus comprising:
  a timer which measures a present time;
  a detection circuit which detects a re-setting of time in the timer and generates a detection signal;
  a first memory circuit which stores a difference integration value corresponding to an amount of change from a reference value in response to the detection signal;
  a second memory circuit which stores information necessary for an accounting calculation process for a call charge based on time information measured by the timer in association with a call-sending extension for each extension; and
  a control circuit which makes the second memory circuit store start time information supplied from the timer and the difference integration value supplied from the first memory circuit, in the second memory circuit in association with the call-sending extension, when the call has started, and makes the second memory circuit store end time information supplied the timer and the difference integration value, in the second memory circuit in association with the extension, when the call has ended.

4. A private branch exchange apparatus capable of connecting a plurality of extensions to extension terminals and at least one outside line, the apparatus comprising:

a timer which measures a present time;

a detection circuit which detects a re-setting of time in the timer and generates a detection signal;

a first memory circuit which stores a difference integration value corresponding to an amount of change from a reference value in response to the detection signal;

a second memory circuit which stores information necessary for an accounting calculation process for a call charge based on time information measured by the timer in association with a call-sending extension for each extension; and a control circuit which makes the second memory circuit store start time information supplied from the timer and the difference integration value supplied from the first memory circuit, in the second memory circuit in association with the call-sending extension, when the call has started, and makes the accounting calculation process associated with the call-sending extension execute in response to end time information supplied from timer, based on the end time information, the difference integration value supplied from the first memory circuit, and the start time information and difference integration value supplied from the second memory circuit, when the call has ended.

5. An accounting process method used in a private branch exchange apparatus, the exchange apparatus having a timer which measures a present time, first memory, and second memory, and being capable of connecting a plurality of extensions to extension terminals, connecting at least one outside line, and storing information necessary for an accounting calculation process for a call charge based on start time information and end time information measured by the timer in association with a call-sending extension, the method comprising:

detecting a re-setting of time in the timer and generating a detection signal;

controlling the first memory to store a difference integration value corresponding to an amount of change from a reference value in response to the detection signal;

controlling the second memory to store the start time information supplied from the timer and the difference integration value supplied from the first memory, in the second memory in association with the call-sending extension information, when the call has started; and controlling the second memory to store the end time information supplied the timer and the difference integration value supplied from the first memory, in the second memory in association with the extension, when the call has ended.

6. An accounting process method used in a private branch exchange apparatus, the private branch exchange apparatus having a timer, first memory, and second memory, the private branch exchange apparatus being capable of connecting a plurality of extensions to extension terminals and connecting at least one outside line, and the private branch exchange apparatus executing an accounting calculation process for a call charge on the basis of start time information and end time information measured by the timer in association with a call-sending extension, the method comprising:

detecting a re-setting of time in the timer and generating a detection signal;

controlling the first memory to store a difference integration value corresponding to an amount of change from a reference value in response to the detection signal;

controlling the second memory to store the start time information supplied from the timer and the difference integration value supplied from the first memory, in the second memory in association with the call-sending extension information, when the call has started; and controlling the accounting calculation process associated with the call-sending extension to execute in response to the end time information supplied from the timer, on the basis of the end time information, the difference integration value supplied from the first memory, and the start time information and difference integration value supplied from the second memory, when the call has ended.

* * * * *